(12) United States Patent
Qian et al.

(10) Patent No.: US 9,274,359 B2
(45) Date of Patent: Mar. 1, 2016

(54) ELECTRONIC DEVICE DISPLAY CHASSIS

(75) Inventors: Amy Qian, San Jose, CA (US);
Benjamin M. Rappoport, Los Gatos, CA (US); Jeremy C. Franklin, San Francisco, CA (US); Jiang Ai, Cupertino, CA (US); Jivan K Khosla, Campbell, CA (US)

(73) Assignee: Apple Inc., Cupertino, CA (US)

( * ) Notice: Subject to any disclaimer, the term of this patent is extended or adjusted under 35 U.S.C. 154(b) by 613 days.

(21) Appl. No.: 13/528,465

(22) Filed: Jun. 20, 2012

(65) Prior Publication Data
US 2013/0343085 A1 Dec. 26, 2013

(51) Int. Cl.
*F21V 7/04* (2006.01)
*G02F 1/1333* (2006.01)
(Continued)

(52) U.S. Cl.
CPC ........ *G02F 1/133308* (2013.01); *G02B 6/0085* (2013.01); *G02B 6/0086* (2013.01); *H05K 5/02* (2013.01); *G02F 1/133615* (2013.01); *G02F 2001/133317* (2013.01); *G02F 2001/133325* (2013.01); *G02F 2001/133328* (2013.01); *G02F 2001/133628* (2013.01); *G02F 2201/46* (2013.01)

(58) Field of Classification Search
CPC ............... G02F 1/133608; G02F 1/133615; G02F 1/133603; F21V 15/01; G02B 6/0088
USPC .......... 362/97.1–97.3, 217.1, 217.11, 217.14, 362/217.15, 227, 234, 249.01, 249.02, 253, 362/612, 613, 632–634
See application file for complete search history.

(56) References Cited

U.S. PATENT DOCUMENTS 6,595,922 B1 * 7/2003 Henderson et al. ........... 600/437
7,598,674 B2 10/2009 Jeong
(Continued)

FOREIGN PATENT DOCUMENTS

JP 2006310221 11/2006
JP 2009252419 10/2009

OTHER PUBLICATIONS

Jeremy C. Franklin et al., U.S. Appl. No. 13/421,703, filed Mar. 15, 2012.
(Continued)

*Primary Examiner* — Evan Dzierzynski
*Assistant Examiner* — Meghan Ulanday
(74) *Attorney, Agent, or Firm* — Treyz Law Group, P.C.; G. Victor Treyz; Kendall P. Woodruff (57) ABSTRACT

An electronic device display may include display layers mounted in a display chassis. The display chassis may have a plastic chassis structure and a metal chassis structure. Backlight structures may include a rectangular light guide plate. Light-emitting diodes within the backlight structures may emit light that is coupled into the light guide plate. The display chassis may have four edges that surround a rectangular opening. The rectangular opening may be configured to receive display layers such as the light guide plate. The metal chassis may have a C-shaped cross-section that forms a cavity in which the light-emitting diodes are mounted. The metal chassis structure may have engagement features such as holes and bent tabs. The plastic chassis structure may be overmolded on the metal chassis structure in engagement with the engagement features. Mounting structures may be formed from protruding portions of the plastic chassis structure.

22 Claims, 12 Drawing Sheets

(51) Int. Cl.
   *F21V 8/00* (2006.01)
   *H05K 5/02* (2006.01)
   *G02F 1/1335* (2006.01)

(56) References Cited

U.S. PATENT DOCUMENTS

| | | |
|---|---|---|
| 8,154,680 B2 | 4/2012 | Doyle et al. |
| 2010/0014026 A1 | 1/2010 | Inoue |
| 2010/0321604 A1* | 12/2010 | Choi et al. ............ 349/58 |
| 2012/0020000 A1 | 1/2012 | Mathew et al. |
| 2012/0039091 A1 | 2/2012 | Lee et al. |
| 2012/0194759 A1 | 8/2012 | Shan et al. |

OTHER PUBLICATIONS

Wenyong Zhu, U.S. Appl. No. 13/324,862, filed Dec. 13, 2011.

* cited by examiner

ELECTRONIC DEVICE DISPLAY CHASSIS

BACKGROUND

This relates generally to electronic devices and, more particularly, to electronic devices with displays and associated backlight structures.

Electronic devices such as computers and cellular telephones have displays. Some displays such as plasma displays and organic light-emitting diode displays have arrays of display pixels that generate light. In displays of this type, backlighting is not necessary because the display pixels themselves produce light. Other displays contain passive display pixels that can alter the amount of light that is transmitted through the display to display information for a user but do not produce light themselves. As a result, it is often desirable to provide backlight for a display with passive display pixels.

In a typical backlight assembly for a display, a light guide plate is used to distribute backlight generated by a light source such as a light-emitting diode light source. Optical films such as a diffuser layer and brightness enhancing film may be placed on top of the light guide plate. A reflector may be formed under the light guide plate to improve backlight efficiency.

To provide satisfactory backlighting, it may be desirable to locate one or more strips of light-emitting diodes on the edges of a light guide plate. A strip of light-emitting diodes may be formed by mounting a row of light-emitting diodes onto a flexible printed circuit. Light-emitting diode strips are typically attached at the edges of the light guide plate so that the light-emitting diodes can direct light into the light guide plate.

To hold the strip of light-emitting diodes and the layers of the backlight assembly in place, backlight components such as these may be mounted in a display chassis. Display layers associated with the active portions of a display may also be mounted to the display chassis.

A typical chassis has a plastic portion that is referred to as the p-chassis and a metal portion that is referred to as the m-chassis. The p-chassis generally has a rectangular ring shape for receiving rectangular backlight and display layers. The m-chassis generally has a corresponding rectangular ring shape that provides the p-chassis with rigidity and helps hold the display layers in place within a device housing.

In compact devices and devices with multiple light-emitting diodes, challenges may arise in forming a display chassis. When space is at a premium, the dimensions associated with conventional chassis designs may make a chassis more bulky than desired. Light-emitting diodes produce heat, which can be challenging to dissipate properly during operation. Mounting structures associated with a conventional chassis may also be weaker than desired.

It would therefore be desirable to be able to provide electronic devices with improved display chassis structures.

SUMMARY

An electronic device may have a housing in which a display is mounted. The display may include display layers mounted in a display chassis. The display chassis may have a plastic chassis structure and a metal chassis structure. Mounting structures on the display chassis may be used to mount the display chassis to the display. The mounting structures may be formed from protrusions that include screw holes or other features to facilitate mounting.

The display may include backlight structures. The backlight structures may provide the display with backlight. The backlight structures may include a rectangular light guide plate. Light-emitting diodes within the backlight structures may emit light that is coupled into the light guide plate. A reflector may be used to help reflect the backlight from the light guide plate through active display layers in the display.

The display chassis may have four edges that surround a rectangular opening. The rectangular opening may be configured to receive display layers such as the light guide plate. The metal chassis may have a C-shaped cross-section that forms a cavity into which the light-emitting diodes are mounted. The metal chassis may run along one of the four edges of the display chassis while the plastic chassis runs along the three remaining edges of the display chassis or the metal chassis may be formed along two opposing display edges while the plastic chassis forms the remaining two edges.

Engagement features such as openings and bent tab-shaped protrusions may be formed in the metal chassis. The plastic chassis may be overmolded on top of portions of the metal chassis and may engage with the engagement features. An opening in the metal chassis may be formed adjacent to each mounting structure. The mounting structures may be formed from portions of the plastic chassis. Plastic mounting structures may be formed from protrusions in the plastic chassis. Each protrusion may have an embedded metal support structure such as a spring. The spring may each have prongs that protrude into an adjacent opening in the metal chassis. Each spring may surround the screw hole in the mounting structure in which it is embedded. Metal support structures for plastic mounting structure protrusions may also be formed from metal gaskets that are coupled to the metal chassis.

Further features of the invention, its nature and various advantages will be more apparent from the accompanying drawings and the following detailed description of the preferred embodiments.

DETAILED DESCRIPTION

A display may be provided with backlight structures. The backlight structures may produce backlight for the display that helps a user of a device view images on the display in a variety of ambient lighting conditions. The backlight structures and other display structures may be mounted in a display chassis. The display chassis may have a metal portion in which light sources such as light-emitting diodes may be mounted and may have a plastic portion that serves as a frame for display structures such as backlight structures and associated display layers (e.g., optical films such as a diffuser layer, brightness enhancing film, etc.).

Figure 1:
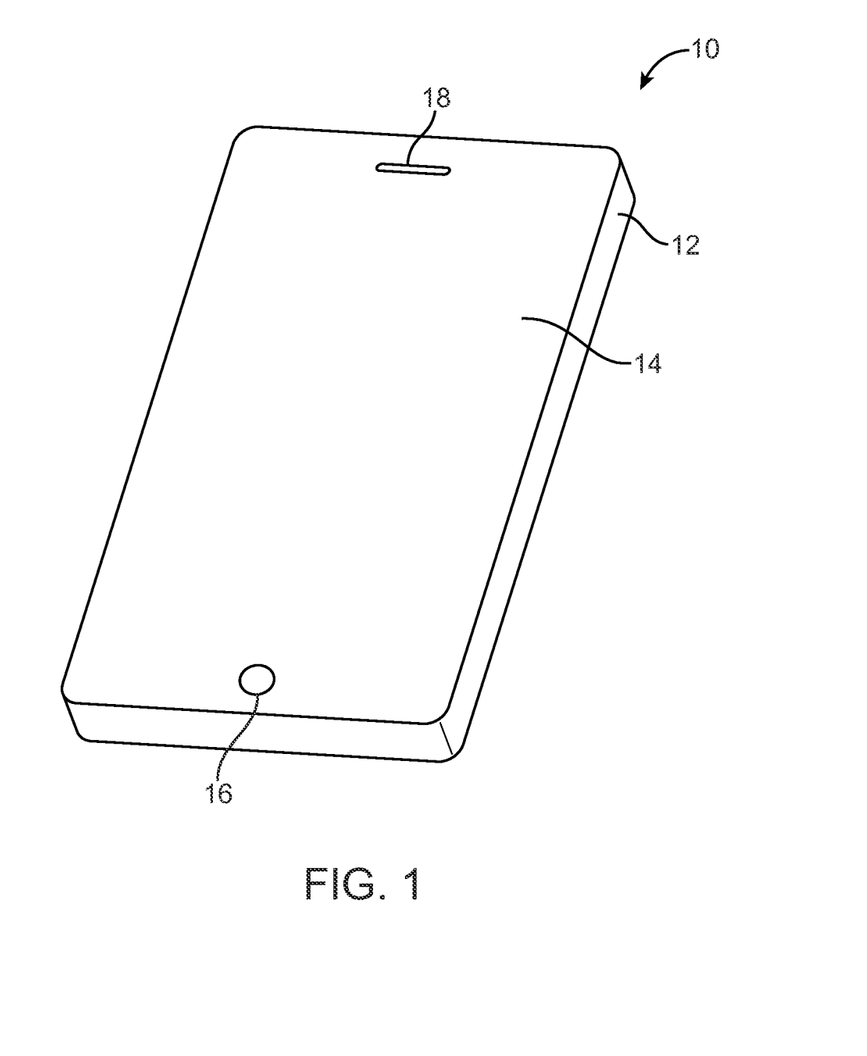
FIG. 1 is a perspective view of an illustrative electronic device with display structures in accordance with an embodiment of the present invention.

An illustrative electronic device of the type that may be provided with a display is shown in FIG. 1. Electronic device 10 may be a computer such as a computer that is integrated into a display such as a computer monitor, a laptop computer, a tablet computer, a somewhat smaller portable device such as a wrist-watch device, pendant device, or other wearable or miniature device, a cellular telephone, a media player, a tablet computer, a gaming device, a navigation device, a computer monitor, a television, or other electronic equipment.

As shown in FIG. 1, device 10 may include a backlit display such as display 14. Display 14 may be a touch screen that incorporates capacitive touch electrodes or other touch sensor components or may be a display that is not touch-sensitive. Display 14 may include an array of display pixels formed from liquid crystal display (LCD) components or other suitable display pixel structures. Arrangements in which display 14 is formed using liquid crystal display pixels are sometimes described herein as an example. This is, however, merely illustrative. Any suitable type of display technology may be used in forming display 14 if desired.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18.

Device 10 may have a housing such as housing 12. Housing 12, which may sometimes be referred to as a case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.). The periphery of housing 12 may, if desired, include conductive walls. For example, housing 12 may have a peripheral conductive member such as a metal housing sidewall member or a display bezel. One or more openings may be formed in housing 12 to accommodate connector ports, buttons, and other components.

Figure 2:
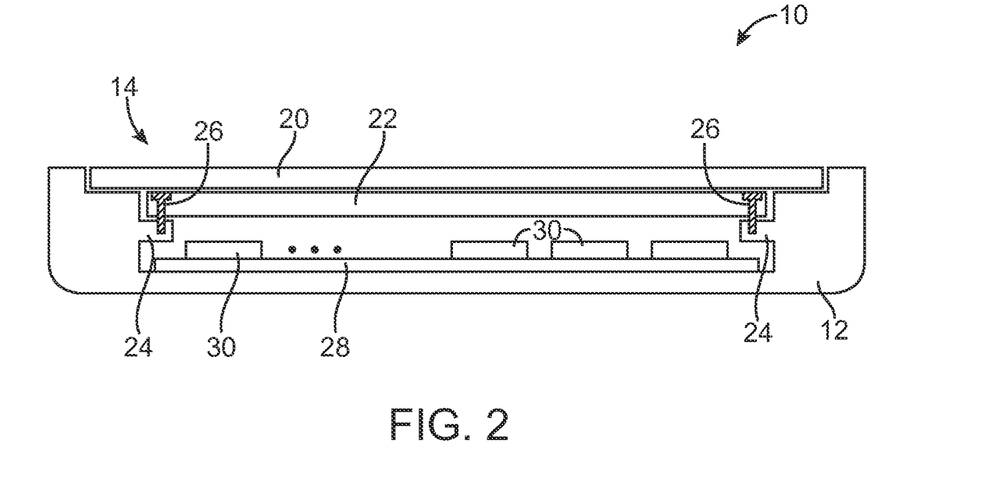
FIG. 2 is a cross-sectional side view of an illustrative electronic device with display structures in accordance with an embodiment of the present invention.

A cross-sectional side view of electronic device 10 is shown in FIG. 2. As shown in FIG. 2, device 10 may include a display such as display 14 mounted in housing 12. Display 14 may include display structures 22 and display cover layer 20. Display cover layer 20 may be formed from a layer of clear glass, a layer of transparent plastic, or other transparent materials. Display structures 22 may include layers of material for forming an active array of display pixels and backlight structures. Display structures 22 may be mounted within housing 12 under display cover layer 20. For example, fasteners such as screws 26 may be used to attach display structures 22 to housing 12. Display structures 22 may, as an example, have mounting structures with screw holes through which screws 26 may pass and housing 12 may have threaded openings for receiving the threaded tips of screws 26. Other mounting schemes for display structures 22 may be used if desired. For example, display structures 22 may be mounted within device 10 using adhesive, using welds, using mating engagement structures (e.g., snaps), or using other mounting techniques.

Device 10 may include components such as components 30. Components 30 may include components such as integrated circuits, switches, connectors, sensors, input-output devices, audio circuitry, batteries, and other electrical components. Components 30 may be mounted on one or more substrates such as substrate 28. Substrate 28 may be a rigid printed circuit board (e.g., a board formed from fiberglass-filled epoxy or other rigid printed circuit board material), a flexible printed circuit formed from a sheet of polyimide or other flexible polymer layer, a plastic carrier, a support structure formed from other dielectric materials such as ceramic or glass, or other substrate structures.

Figure 3:
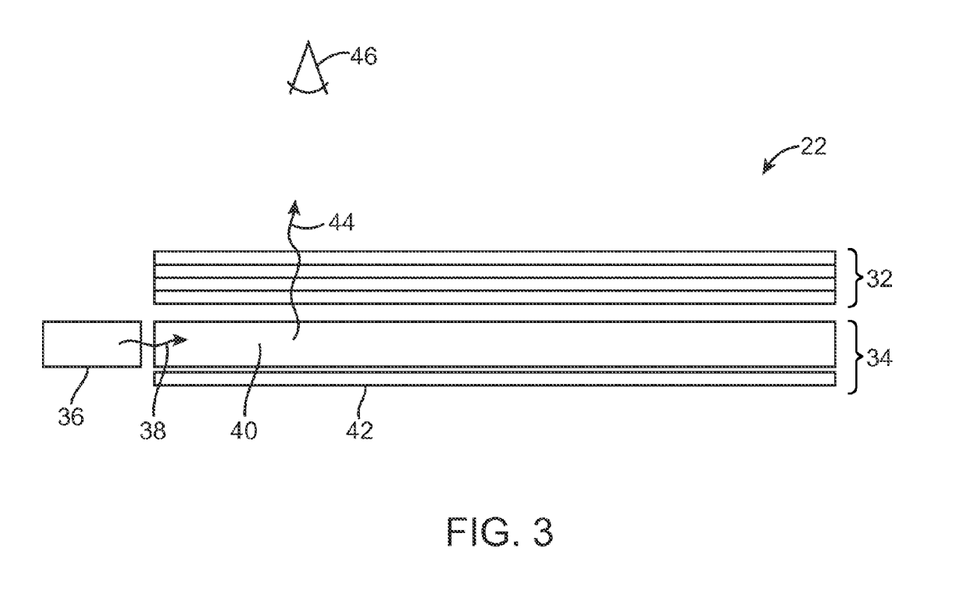
FIG. 3 is a cross-sectional side view of backlight structures and associated display layers in accordance with an embodiment of the present invention.

As shown in FIG. 3, display structures 22 may include display layers 32. Display layers 32 may include structures for forming an array of display pixels. As an example, display layers 32 may include liquid crystal display (LCD) display layers such as a lower polarizer, a thin-film transistor layer having a substrate of glass or plastic that is covered with an array of pixel electrodes and thin-film transistor circuitry for controlling the application of display signals to the electrodes, a color filter layer having an array of color filter elements for providing display pixels with the ability to display color images, a layer of liquid crystal material sandwiched between the thin-film transistor layer and the color filter layer, and an upper polarizer layer (as examples). Display structures 22 may also include optical films such as diffuser layers, brightness enhancing films, and other optical films. These films may be associated with backlight structures such as backlight structures 34 and may, if desired, be mounted in a display structure with one or more other display layers in backlight structures 34.

Backlight structures 34 may provide backlight for display structures 22. Backlight structures 34 may include a light source such as an array of light-emitting diodes 36. Light-emitting diodes 36 may produce light 38. Light 38 may be launched into the edge of light guide plate 40. Light guide plate 40 may be formed from a sheet of clear plastic. Light 38 may be guided within light guide plate 40 due to the principal of total internal reflection. Light 44 that scatters upwards from light guide plate 40 may serve as backlight for display layers 32, allowing user 46 to view backlit images on display 14. Reflector 42 may reflect light that escapes downwards back in the upwards direction, thereby enhancing backlight efficiency. Reflector 42 may be formed from a reflective material such as white plastic, a layer of reflective plastic on a plastic carrier (e.g., a polyethylene terephthalate sheet), a metalized polymer layer, a white paper layer, or other reflective layer.

Figure 4:
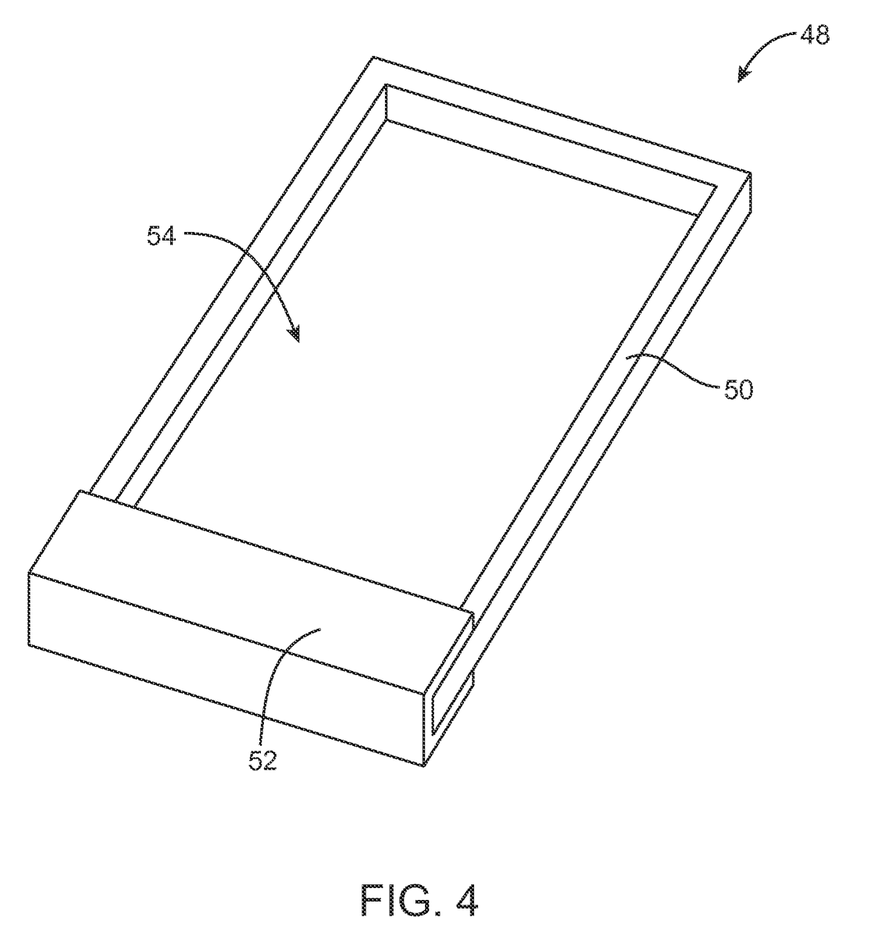
FIG. 4 is a perspective view of an illustrative display chassis in accordance with an embodiment of the present invention.

Display structures 22 may be mounted within support structures such as display structure chassis 48 of FIG. 4. Chassis 48 may have a rectangular opening such as opening 54. Rectangular display structures may be mounted within rectangular opening 54. Examples of rectangular display structures that may be mounted within or above opening 54 include backlight structures 34 (e.g., a rectangular light guide plate, a rectangular reflector, and rectangular optical films such as diffuser layers and brightness enhancing films). If desired, additional display structures 22 may also be mounted within chassis 48 or attached to chassis 48 such as rectangular polarizers, a rectangular thin-film-transistor layer, and a rectangular color filter layer.

Display structure chassis 48 may include plastic structures such as plastic structures 50 (sometimes referred to as a plastic chassis or p-chassis) and metal structures such as metal structures 52 (sometimes referred to as an m-chassis or metal chassis). Display structure chassis 48 may have a rectangular shape with four edges. Plastic chassis structures 50 may form three of the four edges while metal chassis structure 52 forms one of the four edges (as an example). Light source 36 (e.g., an array of light-emitting diodes) may be mounted within metal structures 52 (i.e., along the metal edge of chassis 48). If desired, chassis 48 may have different configurations (e.g., a configuration in which light-emitting diodes 36 are formed within metal chassis structures 52 along two opposing edges of a rectangular chassis while plastic chassis structures 50 form the remaining two edges of the rectangular chassis).

An example of a plastic material that may be used in forming plastic structures 50 is glass-filled nylon (e.g., nylon with impregnated glass fibers). Other types of materials such as other polymers, materials with other strengthening fibers, or combinations of two or more of these materials may be used in forming plastic structures 50, if desired.

Examples of metal materials that may be used in forming metal structures 52 are aluminum, stainless steel, copper, and copper alloys (as examples). Metal generally has a significantly higher thermal conductivity than plastic, so forming structures 52 from metal may be helpful in conducting heat away from light source 36 during operation of light source 36 to provide backlight for display 14.

Due to the strength that may be achieved using metal, metal structures 52 may be implemented using relatively thin walls. For example, metal structures 52 may be formed from sheet metal having a thickness of about 0.1 to 0.2 mm (as an example). The use of thin metal for forming structures 52 may facilitate the mounting of display structures 48 within an electronic device housing that is compact in size.

Figure 5:
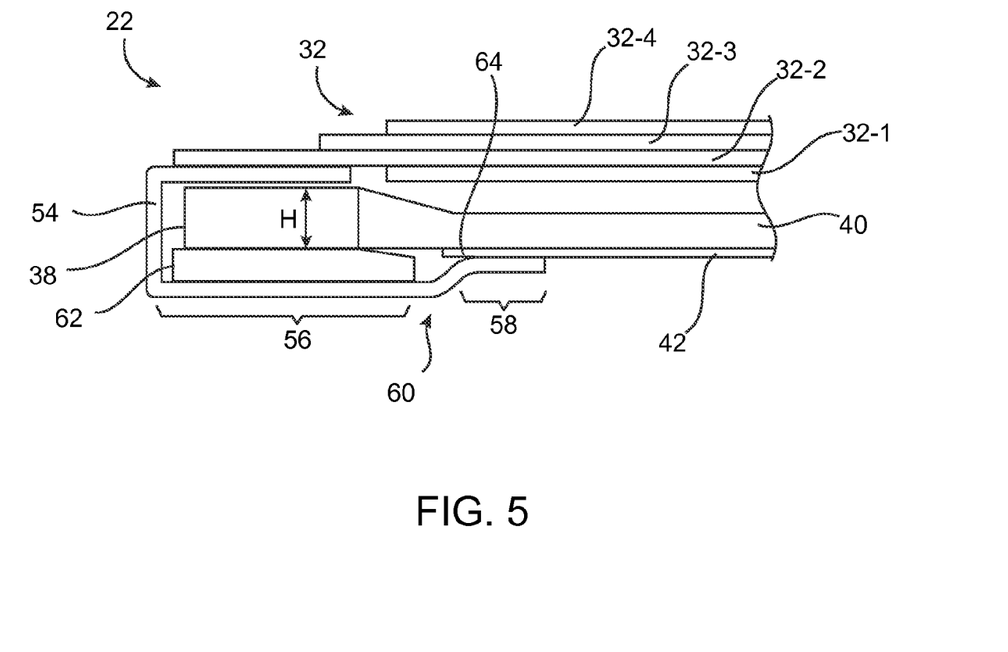
FIG. 5 is a cross-sectional side view of an end portion of a display chassis in accordance with an embodiment of the present invention.

A cross-sectional side view of display structures 48 in the vicinity of metal structures 52 is shown in FIG. 5. As shown in FIG. 5, metal structures 52 may have a C-shape (i.e., a C-shaped cross section). The C-shaped structure formed by metal structures 52 may serve as a sheet metal enclosure (i.e., a C-shaped cavity) that receives and encloses light-emitting diodes such as light-emitting diode 36 (i.e., light-emitting diodes 36 may be mounted within a cavity formed by the C-shaped sheet metal structures of metal chassis 52). Light-emitting diodes 36 may be characterized by a thickness H. The value of H may be, for example, about 0.8 mm, 0.6 to 1.0 mm, less than 1.0 mm, or other suitable values. Display layers 32 may include layers such as layer 32-1 (e.g., a lower polarizer layer), layer 32-2 (e.g., a thin-film transistor layer), layer 32-3 (e.g., a color filter layer), and layer 32-4 (e.g., an upper polarizer layer). Layers 32 may be less than 0.3 mm thick each, less than 0.2 mm thick, or may have other suitable thicknesses.

Structures 54 may have an upper planar wall, an opposing lower planar wall, and a vertical wall that couples the upper and lower planar walls. The lower planar wall may have a first portion such as portion 56 and a second portion such as portion 58 that are coupled by bend 60. Bent portion 60 may be configured so that portion 56 is located farther from the upper planar wall of structures 54 than portion 58. The spacing between the upper planar wall of structures 54 and portion 58 may allow portion 58 to grip reflector 42. The wider spacing between the upper planar wall of structures 54 and portion 56 may provide space that allows free movement of light-emitting diode 36 and flexible printed circuit 62 to which light-emitting diode 36 is mounted.

During assembly of display structures 22, reflector 42 may be added to the lower portion of chassis 48. Reflective tape may then be installed along the upper planar wall of structures 54. A fixture and shim may be used to locate light-emitting diodes 36 within structures 54. Reflective tape may be used in securing light-emitting diodes 36 to structures 54. Following insertion of light-guide plate 40, display layers 32 and other optical films (e.g., a diffuser layer, a brightness enhancing film, etc.) may be added to form structures of the type shown in FIG. 5.

Figure 6:
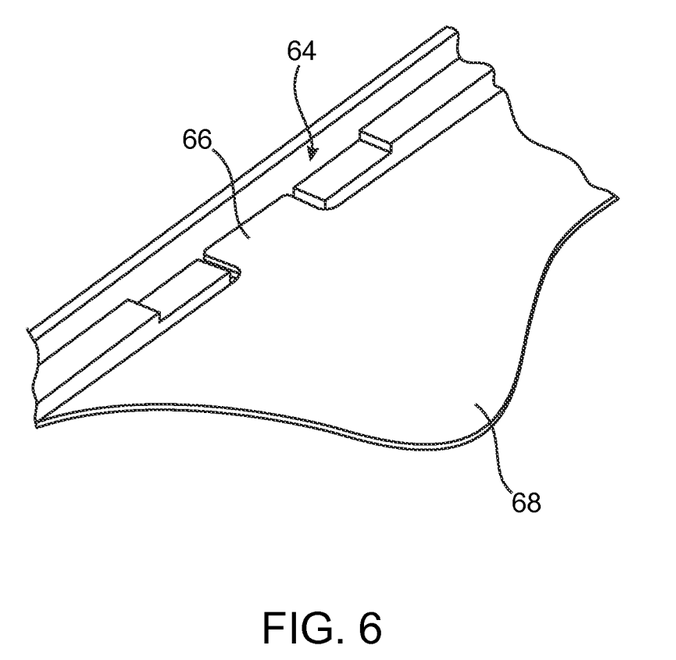
FIG. 6 is a perspective view of a portion of a display chassis showing how a plastic chassis wall portion may have recesses that are configured to receive mating tabs on display layers in accordance with an embodiment of the present invention.

FIG. 6 is a perspective view of an edge portion of plastic chassis structures 50, showing how structures 50 may have recesses such as recess 64 for receiving mating tabs such as tab 66 on layers of display structures such as layer 68.

Figure 7:
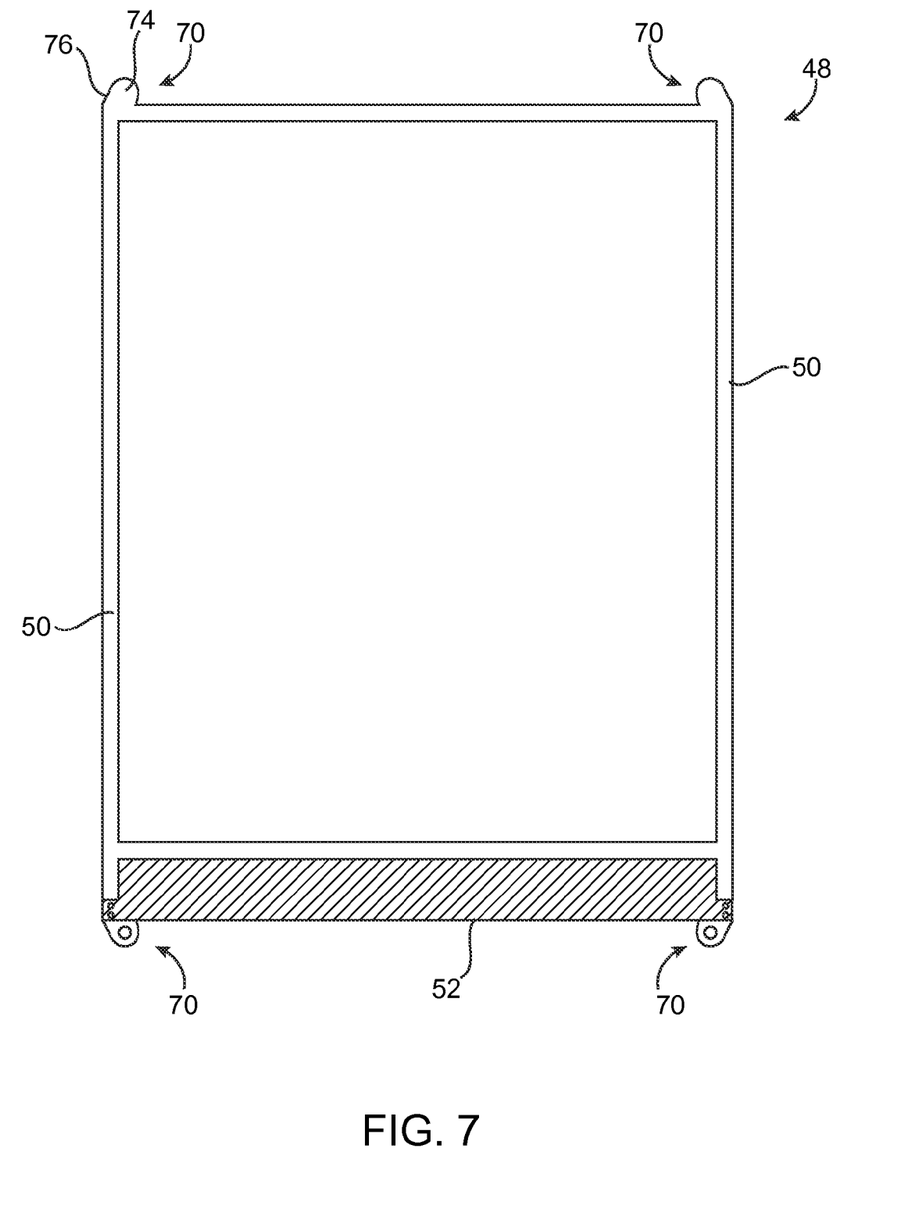
FIG. 7 is a top view of an illustrative display chassis in accordance with an embodiment of the present invention.
Figure 8:
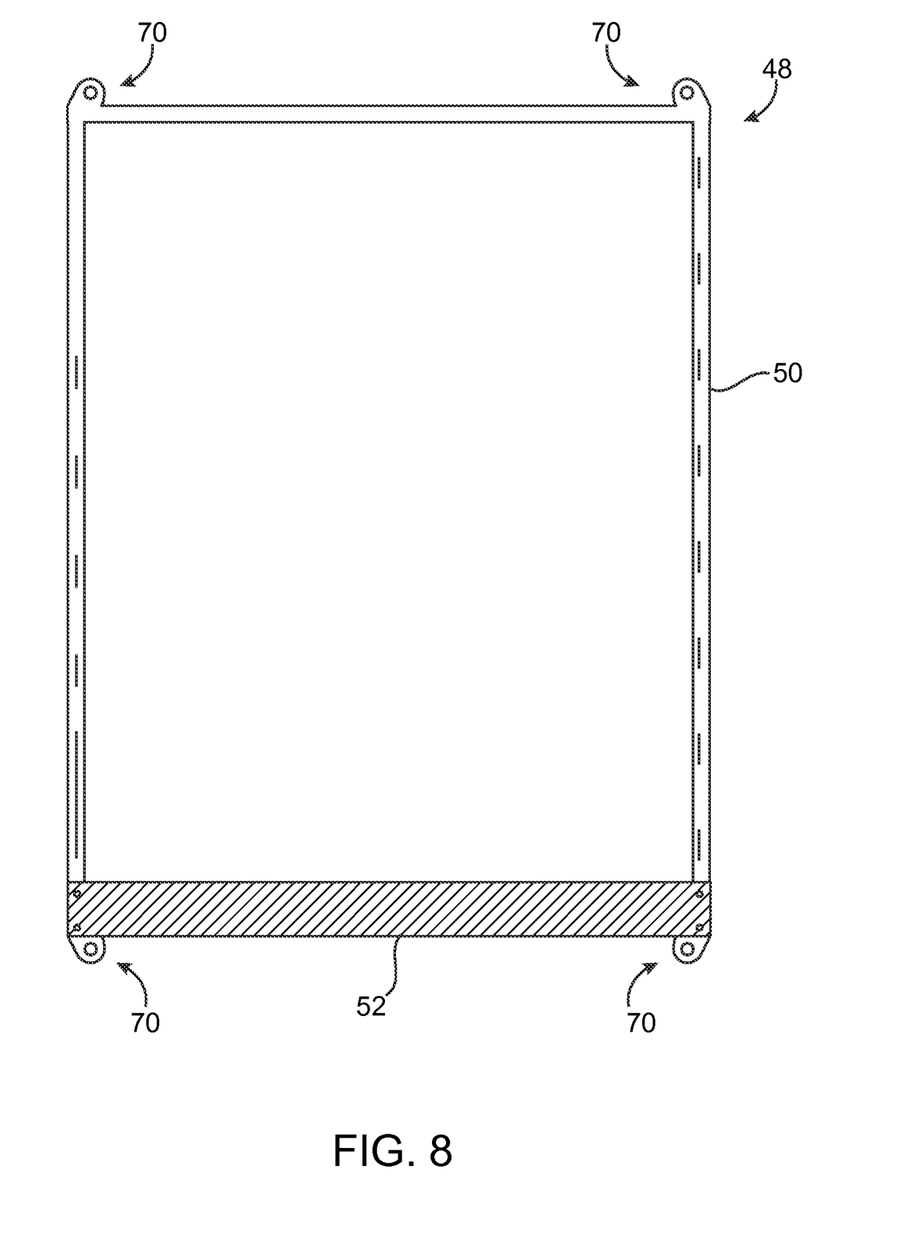
FIG. 8 is a bottom view of the illustrative display chassis in accordance with an embodiment of the present invention.

An illustrative configuration of the type that may be used for display chassis 48 in device 10 of FIG. 1 is shown in FIG. 7. As shown in the top view of FIG. 7, chassis 48 may include mounting structures 70. Each mounting structure 70 may have an opening such as screw hole 74 and a surrounding plastic structure such as plastic structure (protrusion) 76. Plastic structures 76 may be formed from protruding portions of plastic chassis 50. Plastic chassis 50 may be formed by injection molding or other suitable techniques. For example, plastic chassis 50 may be overmolded on top of metal chassis 52. During assembly of device 10, screws may pass through openings 74 and may screw into threaded portions of housing 12 (as an example), thereby securing display chassis 48 and display structures 22 to housing 12 within device 10. A bottom view of display chassis 48 of FIG. 7 is shown in FIG. 8.

Figure 9:
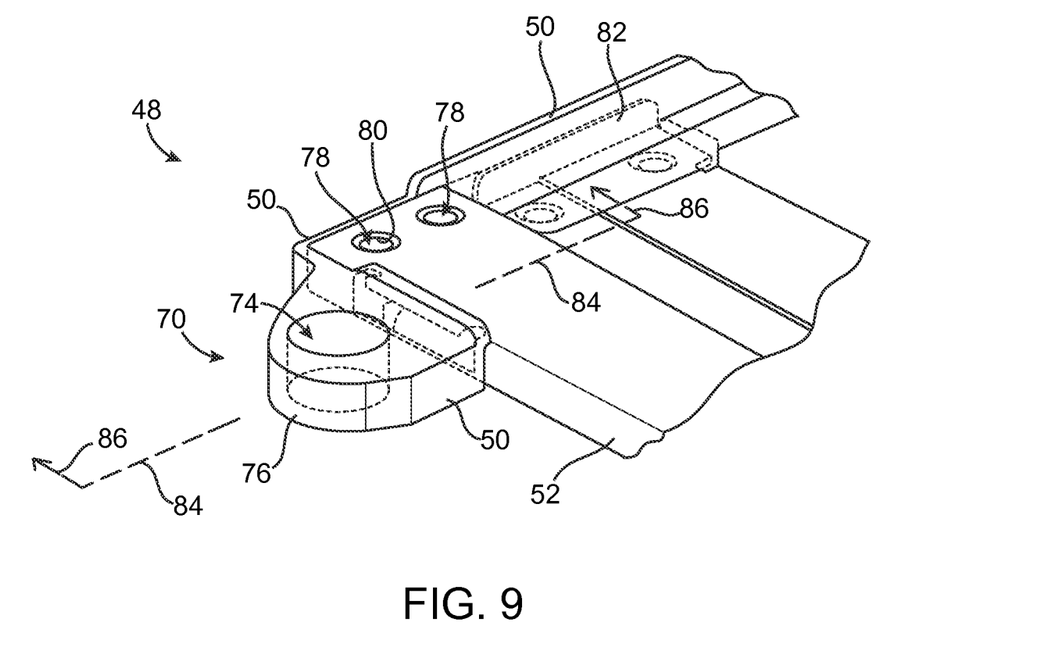
FIG. 9 is a perspective view of a portion of an illustrative display chassis in the vicinity of a mounting structure in accordance with an embodiment of the present invention

A perspective view of a corner portion of chassis 48 is shown in FIG. 9. As shown in FIG. 9, plastic chassis structures 50 may be overmolded over metal chassis structures 52. To ensure that plastic chassis structures 50 securely engage metal chassis structures 52, metal chassis structures 52 may be provided with engagement structures such as holes 78 and bent tab portion 82. Holes 78 may be provided with flared inner peripheries such as inner peripheries 80. With one suitable arrangement, metal chassis structures 52 may be formed from sheet metal and holes 78 may be formed by using a press to pattern the sheet metal.

Mounting structure 70 may be formed from portion 76 of plastic chassis structures 50. Opening 74 may be used to form a screw hole that receives a screw when chassis 48 is mounted within device 10.

Figure 10:
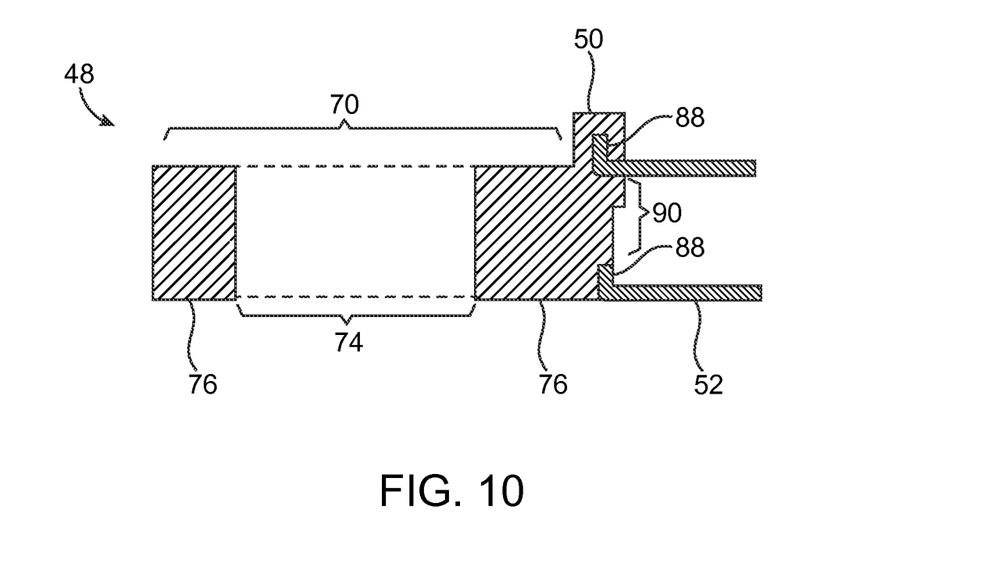
FIG. 10 is a cross-sectional side view of the mounting structure in the illustrative display chassis of FIG. 9 in accordance with an embodiment of the present invention.

FIG. 10 is a cross-sectional side view of chassis 48 in the vicinity of mounting structure 70 taken along line 84 and viewed in direction 86 of FIG. 9. As shown in FIG. 10, metal chassis structure 52 may have engagement features such as opening 90 and bent tab portions 88 to help plastic chassis structures 50 engage metal chassis structures 52 following injection molding of structures 50 onto structures 52.

Figure 11:
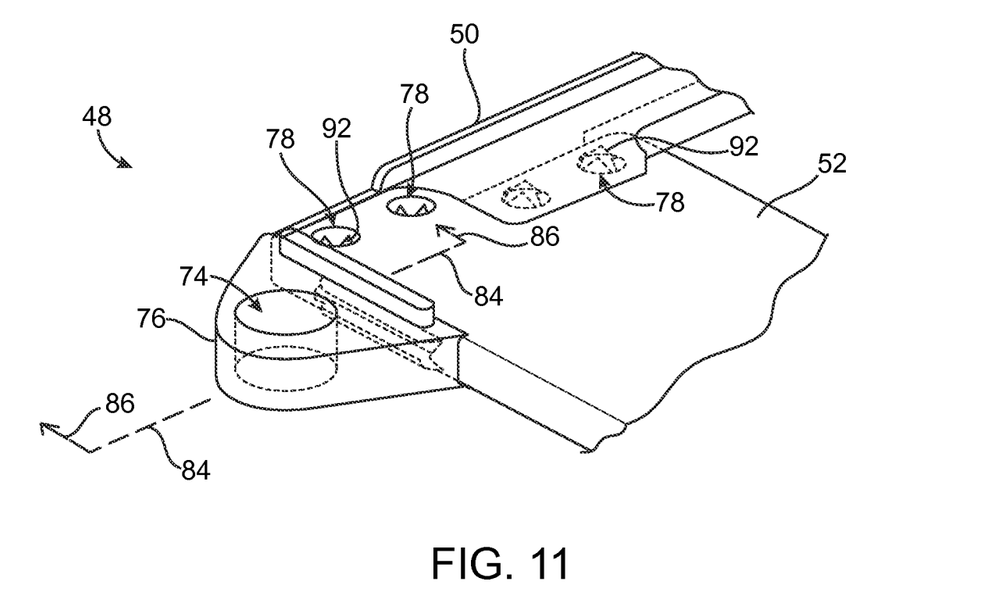
FIG. 11 is a perspective view of a portion of another illustrative display chassis in the vicinity of a mounting structure in accordance with the present invention
Figure 12:
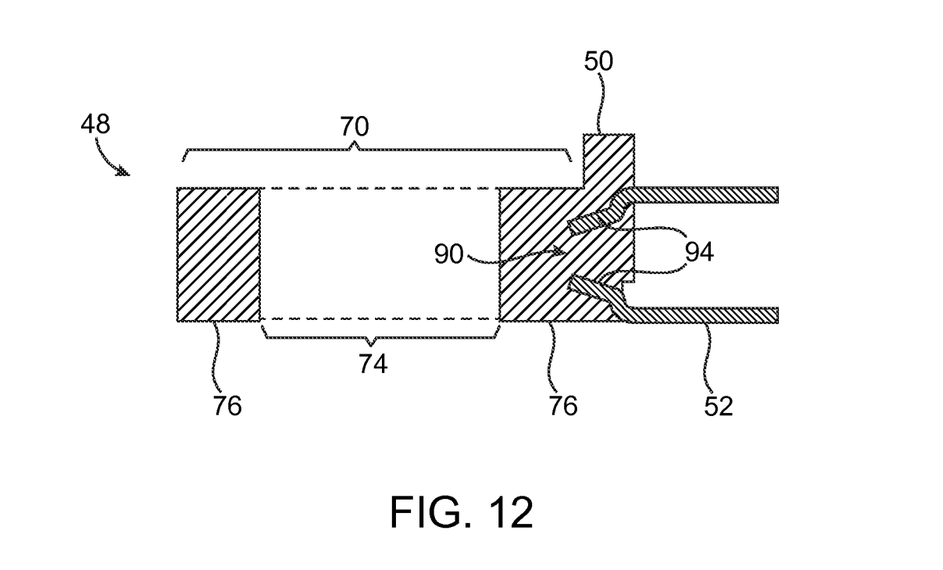
FIG. 12 is a cross-sectional side view of the mounting structure in the illustrative display chassis of FIG. 11 in accordance with an embodiment of the present invention.

A perspective view showing another illustrative configuration that may be used for chassis 48 is shown in FIG. 11. As shown in FIG. 11, openings 78 may have splayed structures such as structures 92 to engage overmolded plastic chassis 50. Structures 92 may be formed by stamping holes 78 using a tool that creates separate bent metal portions within each opening. As shown in FIG. 12, outwardly protruding bent portions 94 on metal chassis structures 52 may be used in forming opening 90 to engage with overmolded plastic chassis structures 50.

Figure 13:
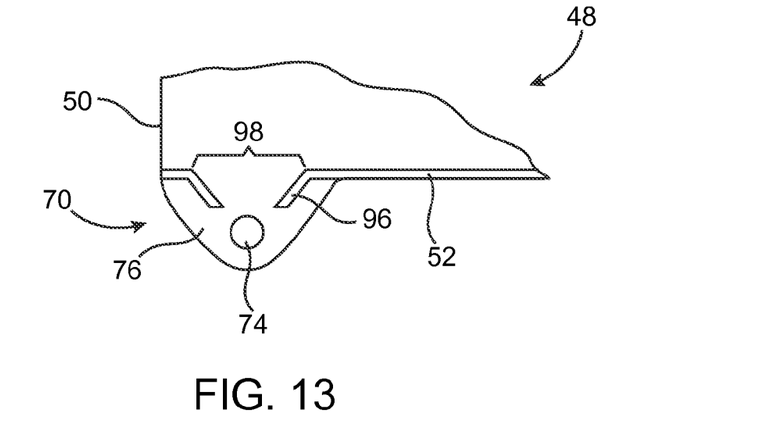
FIG. 13 is a top view of a corner portion of an illustrative display chassis structure having a metal portion with an opening for receiving a mating metal member for forming a mounting structure in accordance with an embodiment of the present invention.

If desired, mounting structures 70 may be supported by incorporating separate embedded metal structures within plastic portion 76 of plastic chassis structures 50. Consider, as an example, a corner portion of chassis 48 such as chassis 48 of FIG. 13. Overmolded plastic 50 may be formed over metal chassis 52. Metal chassis 52 may have portions such as portions 96 that are bent to form opening 98.

Figure 14:
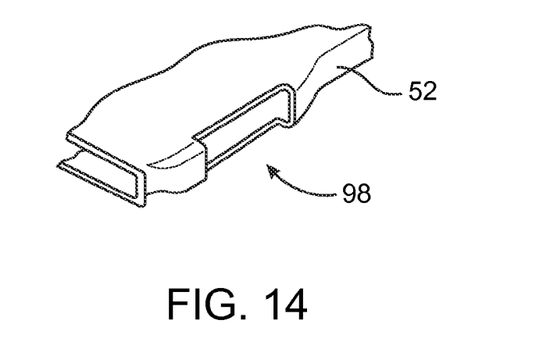
FIG. 14 is a perspective view of the corner portion of the display chassis structure of FIG. 13 showing how the display chassis may have a metal structure with a rectangular opening for receiving a mating metal member for forming a mounting structure in accordance with an embodiment of the present invention.

A perspective view of opening 98 in metal chassis 52 is shown in FIG. 14. Prior to injection molding structures 50 over bent portions 96 to form plastic portions 76 of mounting structures 70 of FIG. 13, a separate metal structure may be inserted in opening 98 such as spring 100 of FIG. 15.

Figure 15:
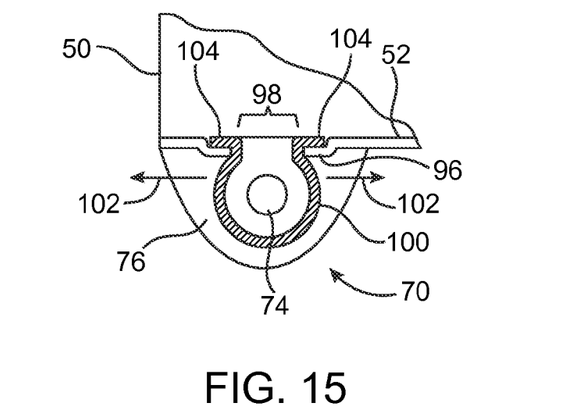
FIG. 15 is a top view of the corner portion of a display chassis having a metal member installed within a metal structure opening to form a mounting structure for the display chassis in accordance with an embodiment of the present invention.

Spring 100 may have a shape such as a horseshoe shape with engagement features such as prongs 104. Initially, spring 100 may be squeezed so that prongs 104 are compressed and pass through opening 98. After prongs 104 have passed through opening 98, the spring may be released. This causes the sides of spring 100 to expand outwardly in directions 102, thereby causing prongs 104 to engage with metal chassis structures 52 along the edges of opening 98. Once spring 100 has been installed within opening 98 of metal chassis structures 52 so that spring 100 is attached to metal chassis structures 52, plastic for chassis 50 may be injection molded over spring 100 and metal chassis 52, thereby forming plastic portion 76 of mounting structure 70 and the remaining portions of plastic chassis 50. By embedding metal support structures such as springs 100 within each mounting structure 70, mounting structures 70 may be strengthened.

Figure 16:
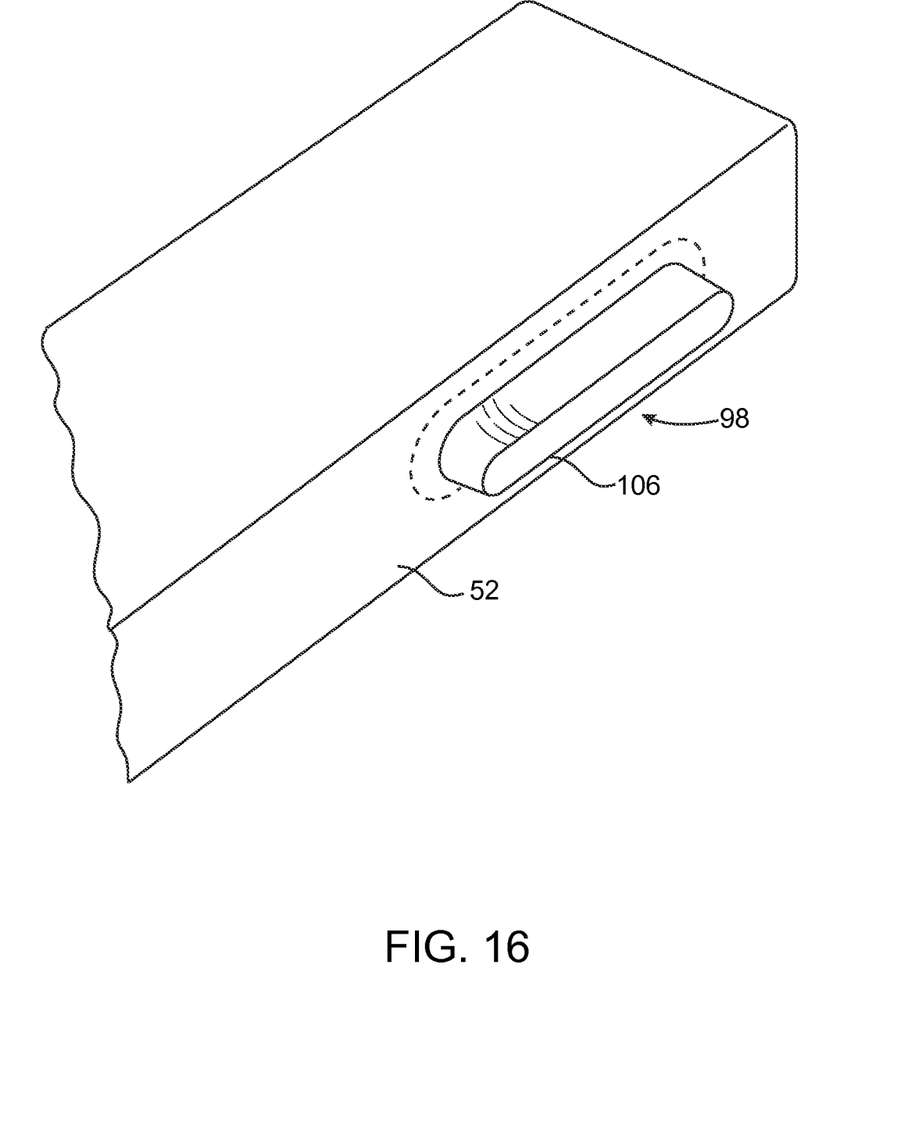
FIG. 16 is a perspective view of a portion of a display chassis having a metal member such as a metal gasket structure to strengthen a display chassis mounting structure in accordance with an embodiment of the present invention.

FIG. 16 is a perspective view of a portion of metal structures 52 showing how a gasket such as gasket structure 106 (e.g., a flanged metal member) may be mounted within opening 98 of metal chassis structures 52. Welds, adhesive, spring structures such as structure 100 of FIG. 15, or other attachment mechanisms may be used in attaching support structure 106 to metal chassis structures 52. Once secured, plastic chassis 50 may be overmolded on top of structures 52 (including separate support structures 106). In this way, plastic chassis 50 may form support structure 70 over embedded metal support structure 106.

The foregoing is merely illustrative of the principles of this invention and various modifications can be made by those skilled in the art without departing from the scope and spirit of the invention. The foregoing embodiments may be implemented individually or in any combination.

What is claimed is:

1. Display structures, comprising:
   light-emitting diodes mounted to a flexible printed circuit;
   a metal chassis structure in which the light-emitting diodes and flexible printed circuit are mounted; and
   a plastic chassis structure that is molded to the metal chassis structure, wherein the metal chassis structure has sheet metal portions that form a cavity in which the light-emitting diodes and flexible printed circuit are mounted, wherein the sheet metal portions are configured to form a C-shaped chassis structure having an upper planar wall and an opposing lower planar wall and wherein the light-emitting diodes are mounted between the upper planar wall and the lower planar wall.

2. The display structures defined in claim 1 wherein the lower planar wall has a first portion and a second portion that are separated by a bend.

3. The display structures defined in claim 1 wherein the C-shaped chassis structure has a plurality of openings that serve as engagement features for the plastic chassis structure.

4. The display structures defined in claim 3 wherein the plastic chassis structure comprises plastic that is overmolded over the plurality of openings.

5. The display structures defined in claim 4 wherein the openings include at least one circular opening with splayed bent metal structures.

6. The display structures defined in claim 4 wherein the openings include at least one circular opening with a flared inner perimeter portion.

7. The display structures defined in claim 1 wherein the sheet metal portions include a vertical wall that extends between the upper planar wall and the lower planar wall.

8. The display structures defined in claim 7 wherein the sheet metal portions include an opening and wherein the plastic chassis structure comprises a protrusion with a screw hole adjacent to the opening.

9. The display structures defined in claim 8 wherein the sheet metal portions have bent tab structures adjacent to the opening.

10. The display structures defined in claim 8 further comprising a metal support structure within the protrusion that strengthens the protrusion.

11. The display structures defined in claim 10 wherein the metal support structure comprises a spring having prongs that engage the sheet metal portions in the opening.

12. The display structures defined in claim 1 wherein the plastic chassis structure and the metal chassis structure are configured to form a rectangular opening that receives a rectangular display layer.

13. Display structures, comprising:
   light-emitting diodes mounted to a flexible printed circuit;
   a metal chassis structure in which the light-emitting diodes and flexible printed circuit are mounted; and
   a plastic chassis structure that is molded to the metal chassis structure, wherein the metal chassis structure has sheet metal portions that form a cavity in which the light-emitting diodes and flexible printed circuit are mounted, wherein the plastic chassis structure and the metal chassis structure are configured to form a rectangular opening that receives a rectangular display layer, wherein the plastic chassis structure and the metal chassis structure are configured to form four edges that surround the rectangular display layer, wherein the plastic chassis structure forms three of the four edges, and wherein the metal chassis structure forms one of the four edges.

14. Display structures, comprising:
   at least one rectangular display layer; and
   a display chassis having a rectangular opening configured to receive the rectangular display layer, wherein the display chassis comprises four edges and wherein the display chassis includes:
      a metal chassis structure that runs along at least one of the edges and that is configured to receive a light source and a flexible printed circuit to which the light source is mounted, and
      a plastic chassis structure that is molded over a portion of the metal chassis structure, wherein at least one of the edges of the display chassis is formed exclusively of the plastic chassis structure.

15. The display structures defined in claim 14 wherein the metal chassis structure runs along a first side of the rectangular display layer and wherein the plastic chassis structure is overmolded onto the metal chassis structure and is configured to run along second, third, and fourth sides of the rectangular display layer.

16. The display structures defined in claim 15 wherein the plastic chassis structure comprises glass-filled nylon and wherein the metal chassis structure is configured to form a C-shaped sheet metal structure having an upper planar wall, a lower planar wall, and a vertical planar wall that extends between the upper planar wall and the lower planar wall.

17. The display structures defined in claim 16 further comprising light-emitting diodes that form the light source, wherein the light-emitting diodes are mounted between the upper planar wall and the lower planar wall.

18. The display structures defined in claim 17 further comprising:
   a light guide plate mounted in the display chassis; and
   a reflector layer having a portion interposed between the lower planar wall and the light guide plate.

19. The display structures defined in claim 14 wherein the metal chassis structure forms a cavity and wherein the light source is received within the cavity.

20. A display chassis, comprising:
   a metal chassis configured to receive light-emitting diodes and a flexible printed circuit to which the light-emitting diodes are mounted; and
   a plastic chassis coupled to the metal chassis, wherein the metal chassis comprises a layer of sheet metal bent to form a cavity with a C-shaped cross section that receives the light-emitting diodes and the flexible printed circuit, wherein the metal chassis comprises engagement features and wherein the plastic chassis comprises plastic material that is overmolded on top of the metal chassis and that has portions that engage the engagement features.

21. The display chassis defined in claim 20 wherein the plastic chassis comprises portions forming mounting structures with screw holes.

22. The display chassis defined in claim 21 further comprising a metal support structure that surrounds at least one of the screw holes and that is embedded within one of the portions of the plastic chassis that forms the mounting structures.

* * * * *